US010671816B1

United States Patent
Zhang et al.

(10) Patent No.: US 10,671,816 B1
(45) Date of Patent: *Jun. 2, 2020

(54) LANGUAGE INDEPENDENT REPRESENTATIONS

(71) Applicant: Facebook, Inc., Menlo Park, CA (US)

(72) Inventors: Ying Zhang, Palo Alto, CA (US); Fei Huang, Chatham, NJ (US); Xiaolong Wang, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/968,983

(22) Filed: May 2, 2018

Related U.S. Application Data (63) Continuation of application No. 14/878,794, filed on Oct. 8, 2015, now Pat. No. 9,990,361.

(51) Int. Cl.
| | |
|---|---|
| *G06F 40/58* | (2020.01) |
| *G06F 40/30* | (2020.01) |
| *G06F 40/42* | (2020.01) |
| *G06F 40/211* | (2020.01) |

(52) U.S. Cl.
CPC .......... *G06F 40/58* (2020.01); *G06F 40/211* (2020.01); *G06F 40/30* (2020.01); *G06F 40/42* (2020.01)

(58) Field of Classification Search
CPC .............. G06F 17/2785; G06F 17/277; G06F 17/2735; G06F 17/271; G06F 17/2705; G06F 17/21; G06F 17/30734; G06F 17/30684; G06F 17/27; G06F 17/2715; G06F 17/30598; G06F 17/30705; G06F 17/2247; G06F 17/2818
See application file for complete search history.

(56) References Cited

U.S. PATENT DOCUMENTS

| 4,797,855 A * | 1/1989 | Duncan, IV | .......... G06F 17/273 400/61 |
| 5,839,106 A * | 11/1998 | Bellegarda | .......... G10L 15/1815 704/257 |
| 6,470,362 B1 * | 10/2002 | Eustace | ............... G06F 17/2229 715/234 |
| 6,714,905 B1 * | 3/2004 | Chang | ................. G06F 17/2705 704/9 |

(Continued)

*Primary Examiner* — Edgar X Guerra-Erazo (57) ABSTRACT

Snippets can be represented in a language-independent semantic manner. Each portion of a snippet can be represented by a combination of a semantic representation and a syntactic representation, each in its own dimensional space. A snippet can be divided into portions by constructing a dependency structure based on relationships between words and phrases. Leaf nodes of the dependency structure can be assigned: A) a semantic representation according to predefined word mappings and B) a syntactic representation according to the grammatical use of the word. A trained semantic model can assign to each non-leaf node of the dependency structure a semantic representation based on a combination of the semantic and syntactic representations of the corresponding lower-level nodes. A trained syntactic model can assign to each non-leaf node a syntactic representation based on a combination of the syntactic representations of the corresponding lower-level nodes and the semantic representation of that node.

20 Claims, 8 Drawing Sheets

(56) References Cited

U.S. PATENT DOCUMENTS

| | | | | |
|---|---|---|---|---|
| 6,721,697 B1* | 4/2004 | Duan | G06F 17/277 | 704/2 |
| 7,028,038 B1* | 4/2006 | Pakhomov | G06F 17/277 | 704/275 |
| 7,203,635 B2* | 4/2007 | Oliver | G06K 9/6293 | 345/156 |
| 7,440,941 B1* | 10/2008 | Borkovsky | G06F 16/3322 | |
| 7,529,657 B2* | 5/2009 | Wang | G06F 17/27 | 454/74 |
| 7,593,843 B2* | 9/2009 | Aue | G06F 17/2818 | 704/2 |
| 7,865,358 B2* | 1/2011 | Green | G06F 17/2785 | 704/10 |
| 7,912,717 B1* | 3/2011 | Galick | G06K 9/6297 | 704/240 |
| 8,069,027 B2* | 11/2011 | Liu | G06F 17/28 | 704/10 |
| 8,135,576 B2* | 3/2012 | Haley | G06F 17/2785 | 704/9 |
| 8,442,940 B1* | 5/2013 | Faletti | G06F 17/2785 | 707/610 |
| 8,700,384 B1* | 4/2014 | Lattyak | G06F 9/454 | 704/8 |
| 9,070,360 B2* | 6/2015 | Yu | G10L 15/01 | |
| 2002/0040292 A1* | 4/2002 | Marcu | G06F 17/271 | 704/4 |
| 2003/0105638 A1* | 6/2003 | Taira | G06F 17/2881 | 704/275 |
| 2005/0240439 A1* | 10/2005 | Covit | G06Q 10/00 | 705/2 |
| 2006/0015317 A1* | 1/2006 | Nakagawa | G06F 17/2755 | 704/1 |
| 2006/0277029 A1* | 12/2006 | Green | G06F 17/2785 | 704/4 |
| 2008/0270120 A1* | 10/2008 | Pestian | G06F 17/2785 | 704/9 |
| 2009/0089046 A1* | 4/2009 | Uchimoto | G06F 17/277 | 704/9 |
| 2009/0119095 A1* | 5/2009 | Beggelman | G06F 17/2785 | 704/9 |
| 2009/0228299 A1* | 9/2009 | Kangarloo | G06F 19/321 | 705/2 |
| 2010/0299132 A1* | 11/2010 | Dolan | G06F 17/2845 | 704/2 |
| 2010/0306249 A1* | 12/2010 | Hill | G06Q 30/02 | 707/769 |
| 2012/0239378 A1* | 9/2012 | Parfentieva | G06F 17/2785 | 704/4 |
| 2015/0032443 A1* | 1/2015 | Karov | G06F 17/2785 | 704/9 |
| 2017/0039181 A1* | 2/2017 | Karov | G06F 17/2785 | |

* cited by examiner

LANGUAGE INDEPENDENT REPRESENTATIONS

CROSS-REFERENCE TO RELATED APPLICATIONS

This application is a continuation of, claims the benefit of and priority to previously filed U.S. patent application Ser. No. 14/878,794 filed Oct. 8, 2015, entitled "Language Independent Representations", which is hereby incorporated by reference in its entirety.

BACKGROUND

The Internet has made it possible for people to connect and share information across the globe in ways previously undreamt of. Social media platforms, for example, enable people on opposite sides of the world to collaborate on ideas, discuss current events, or just share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different languages used around the world is a particular challenge, several machine translation engines have attempted to address this concern. Machine translation engines enable a user to select or provide a content item (e.g., a message from an acquaintance) and quickly receive a translation of the content item. However, content items can be inaccurately translated due to translation rules that do not account for the semantics of the content item being translated. For example, variants of the same language (e.g., American English versus British English), different meanings of the same word or phrase, non-standard phrases (e.g., slang), etc., can result in machine translation inaccuracies. For example, the word "lift" can mean "move upward" among speakers of American English (as that word is commonly used in America), whereas it can mean "elevator" for British English speakers. A content item including the phrase, "press the button for the lift," could be translated into either "press the button for the elevator" or "press the button to go up." In addition, machine translations of a content item are often based on dictionary translations and do not consider context, which often makes a significant difference such as in slang or colloquial passages.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A language independent representation system is disclosed that can transform a selected language snippet in a source domain into a language independent representation. The language independent representation system can then use the language independent representation to locate a corresponding snippet in a different domain, such as a translation of the snippet or a corrected version of the snippet. As used herein, a "language snippet" or "snippet" is a digital representation of one or more words or groups of characters from a natural language. One type of language independent representation of a snippet is a semantic vector, or a vector created from a snippet by applying a series of transformation functions that create and map the vector corresponding to the snippet into language independent space. These language independent representations can encompass the meaning of a word or phrase and their meanings can be combined and operated on. For example, given semantic vectors represented using the notation < >, such that <queen> is the semantic vector representing the meaning of "queen:" <queen>-<woman>=<king>-<man>=<ruler>. In some implementations, language snippets can be obtained from social network content items, such as posts.

The language independent representation system can create a language independent representation of a snippet by converting the snippet into a dependency structure then use trained semantic and syntactic models to iteratively generate, for multiple nodes of the dependency structure, both a semantic representation and a syntactic representation of that node. In some implementations, the semantic or syntactic representations of dependency structure nodes can be language independent vectors.

Figure 4A:
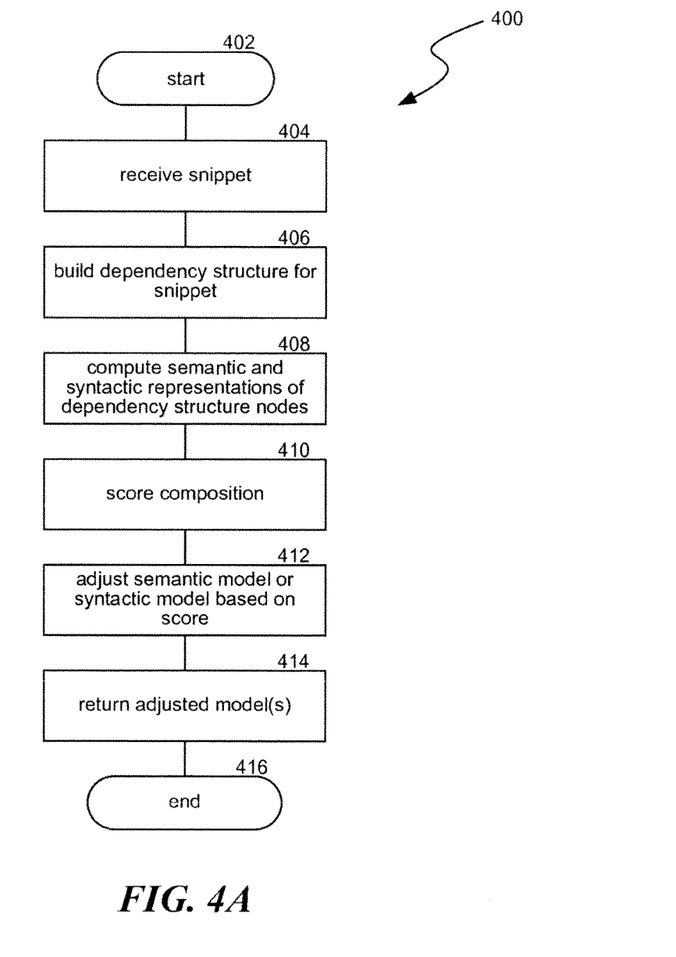
FIG. 4A is a flow diagram illustrating a process used in some implementations for training semantic and syntactic models.
Figure 4B:
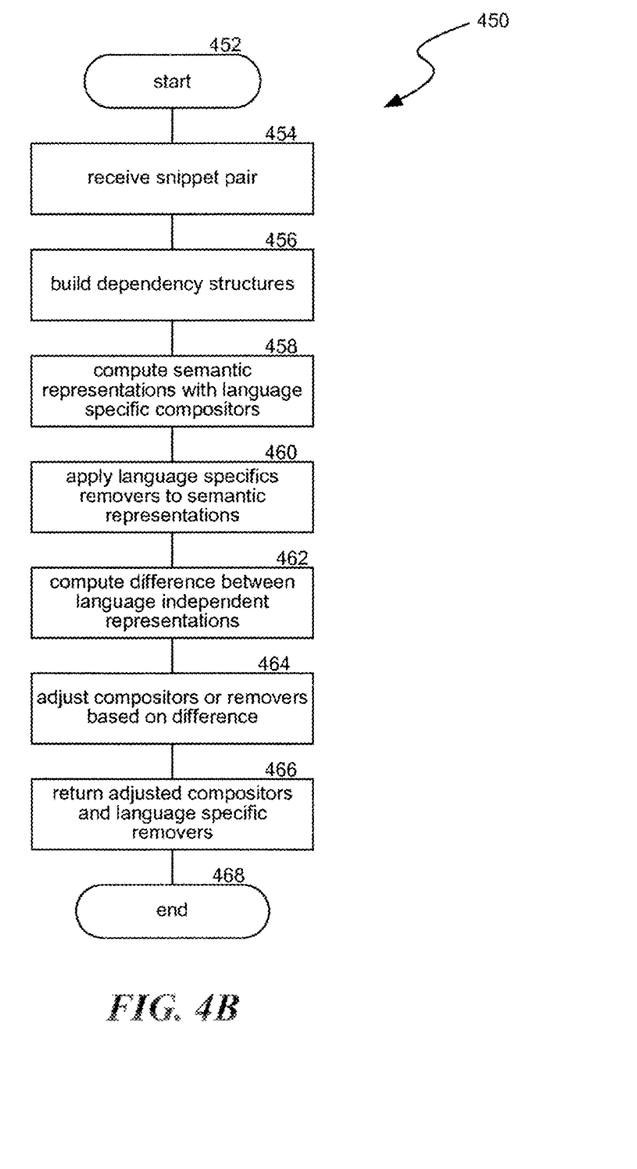
FIG. 4B is a flow diagram illustrating a process used in some implementations for training compositors and language specifics removers.

The semantic language processing system can convert an input snippet into a dependency structure by dividing the input snippet into groups of one or more words, with each word group set as a leaf node in the dependency structure. "Words," as used herein, can be traditional words, i.e. characters separated by whitespace or punctuation, or can be other character groupings, such as a specified number of characters. The semantic language processing system can then identify relationships between word groups. Based on these relationships, word groups can be combined to create intermediate nodes in the dependency structure. When all the lower-level nodes corresponding to word groups have been combined into a single node, this node is the root node of the dependency structure. For example, if the input snippet is "A fast car," the word group "fast" has a modifier relationship with word group "car." Thus, the leaf nodes corresponding to "fast" and "car" can be combined into the intermediate node "fast car." The word group "A" has a "singular article" relationship with the word group "fast car." Thus the leaf node corresponding to "A" and the intermediate node corresponding to "fast car" can be combined into the root node "A fast car." Additional details regarding converting an input snippet into a dependency structure are provided below in relation to FIG. 4 and FIG. 5.

For leaf nodes of the dependency structure, pre-defined semantic representations can be obtained representing the corresponding word groups, and pre-defined syntactic representations can be obtained representing uses of the corresponding word group. For non-leaf nodes of the dependency structure, semantic representations can be obtained by applying learned functions to the semantic and syntactic representations of lower-level nodes that were combined to create that non-leaf node. Syntactic representations of these non-leaf nodes can be obtained by using learned functions to operate on the syntactic representations of nodes that were combined to create that non-leaf node and the semantic representation of that non-leaf node.

In some implementations, the semantic representation of the root node of the dependency, i.e. the input vector, can be converted to an alternate output domain, such as a different language, by mapping the input vector into a vector space that includes output vectors corresponding to snippets in the output domain; selecting an output vector most similar to the input vector; and providing an output snippet corresponding to the output vector as the transformation of the snippet in the output domain. Additional details regarding obtaining a domain transformation of a selected snippet are provided below in relation to FIG. 7.

Semantic and syntactic models can be trained transformation functions or sets of functions. In some implementations, a semantic model can include a function that generates a tensor based on two syntactic vectors, two functions that generate matrices based on two syntactic vectors, and a function that generates an offset vector based on two syntactic vectors. The semantic model can be applied to a snippet by combining the results of the semantic model functions with semantic vectors representing parts of the snippet. In some implementations, a syntactic model can include a function that generates a tensor based on two syntactic vectors, two functions that generate matrices based on two syntactic vectors, a function that generates an offset vector based on two syntactic vectors, and a translation matrix between semantic and syntactic space. The syntactic model can be applied to a snippet by combining the results of the semantic model functions with syntactic vectors representing uses of parts of the snippet and a semantic representation of the snippet.

For a particular snippet for which a dependency structure has been built, and for which semantic and syntactic models have been applied to the nodes of the dependency structure to create a semantic representation corresponding to the root node of the dependency structure, the resulting composition of these items can be scored. A scoring model, such as a trained neural network or other transformation function, can be used to compute the composition score. Based on the composition score, the parameters of the semantic or syntactic models can be adjusted. Initially, the parameters of the semantic or syntactic models can be set to default or random values. As the multiple compositions are scored and the parameters of the semantic or syntactic models are adjusted, the ability of the models to effectively generate semantic and syntactic representations can improve, thus training the models. Additional details regarding generating dependency structures, training semantic and syntactic models, and applying semantic and syntactic models to a dependency structure to generate a language independent representation of a snippet are provided below in relation to FIGS. 4-6.

Figure 1:
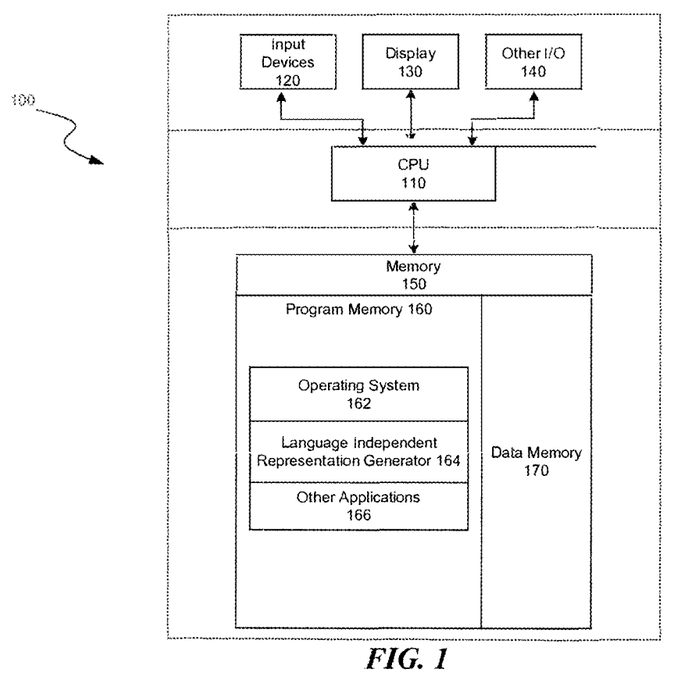
FIG. 1 is a block diagram illustrating an overview of devices on which some implementations of the disclosed technology can operate.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that performs semantic language processing. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected or holographic display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, language independent representation generator 164, and any other application programs 166. Memory 150 also includes data memory 170 that can include dependency structures, language independent snippet representations, semantic models, syntactic models, scoring models, snippets, language specific removers, threshold values, loaded algorithm code for building and manipulating these structures, configuration data, settings, and user options or preferences which can be provided to the program memory 160 or any element of the device 100.

The disclosed technology can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
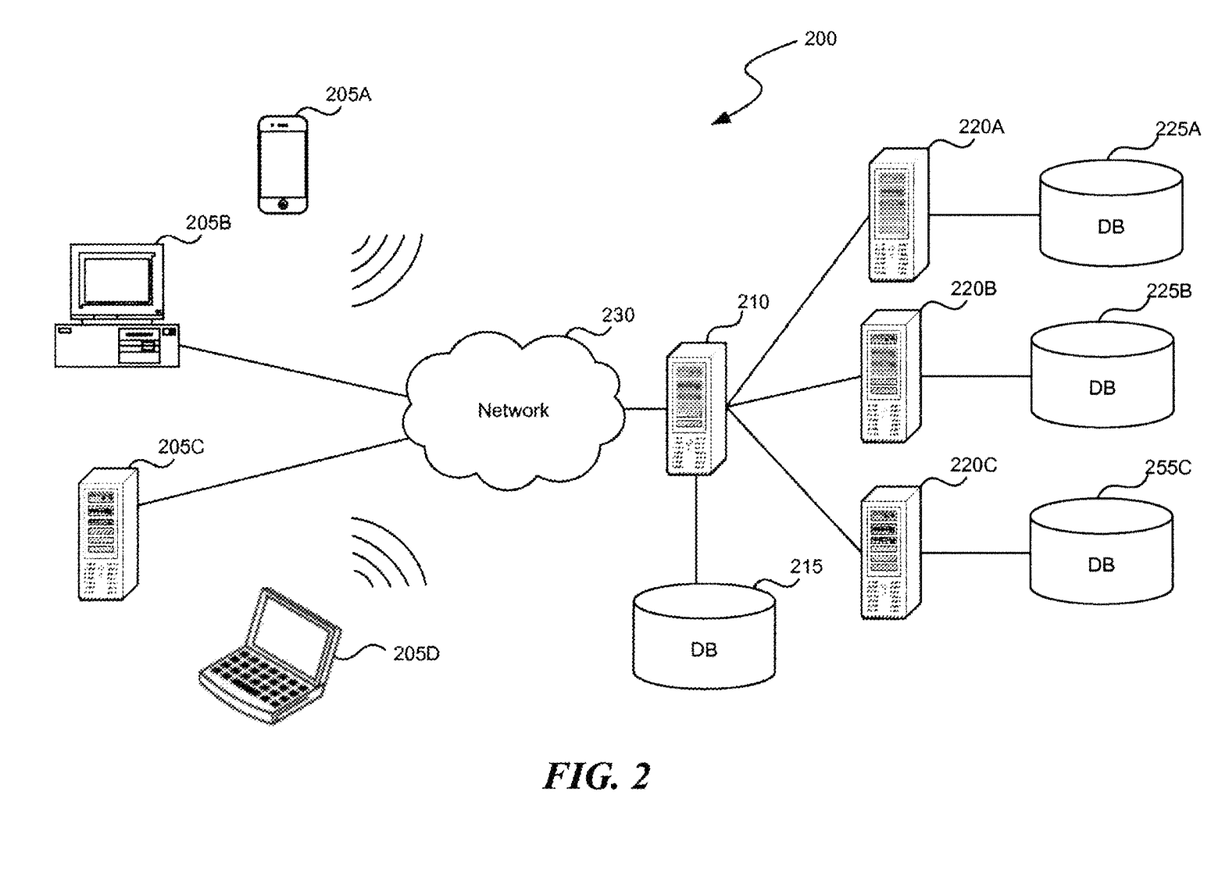
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which can include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as snippets, dependency structures, semantic vectors, syntactic vectors, semantic and syntactic models, and virtual spaces. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
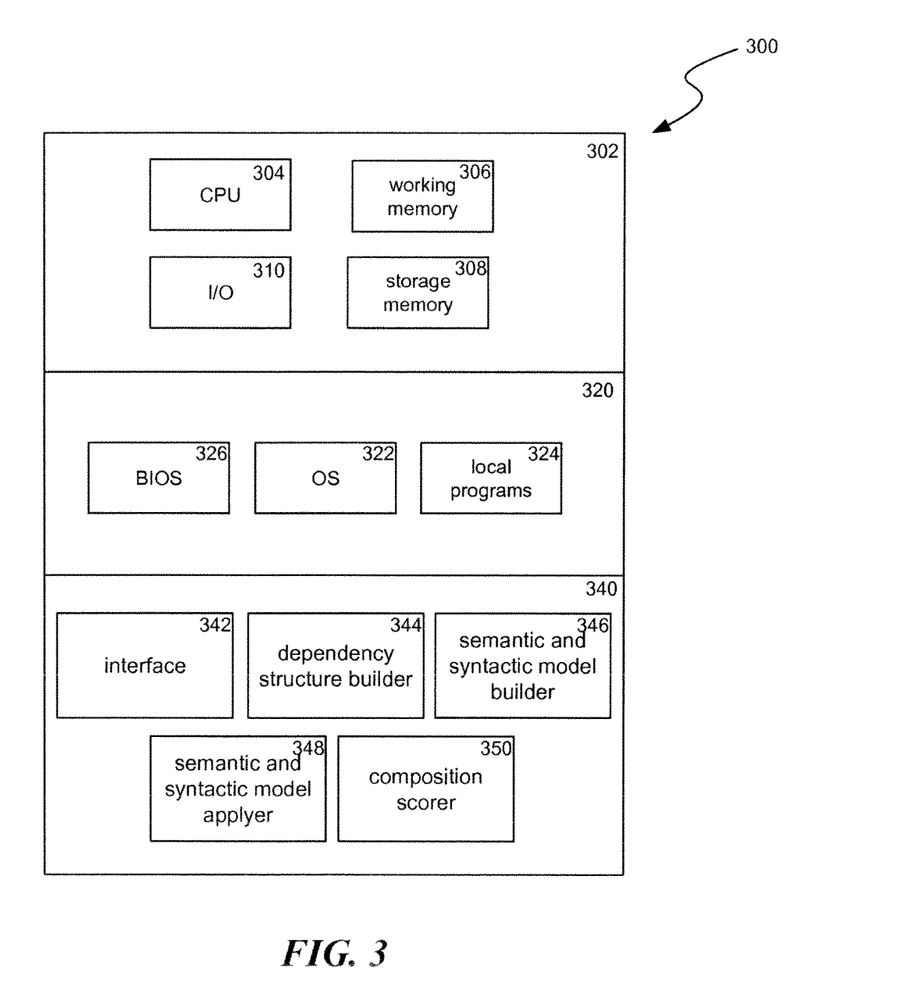
FIG. 3 is a block diagram illustrating components which, in some implementations, can be used in a system employing the disclosed technology.

FIG. 3 is a block diagram illustrating components 300 which, in some implementations, can be used in a system implementing of the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include dependency structure builder 344, semantic and syntactic model builder 346, semantic and syntactic model applier 348, composition scorer 350, vector space builder/comparer 352, and components which can be used for controlling and receiving data from the specialized components, such as interface 342. In some implementations, components 300 can be in a computing system that is distributed across multiple computing devices or can include an interface to a server-based application.

Dependency structure builder 344 can build a dependency structure corresponding to a language snippet. A dependency structure can be an inverted tree structure built by identifying leaf nodes at a lowest level and progressively adding intermediate nodes based on a combination of two or more lower level nodes until a root node is added that is a combination representing the word groups of all the leaf nodes. In some implementations, unlike traditional tree structures, higher level nodes in the inverted tree structure can result from nodes in two or more different lower levels. Dependency structure builder 344 can create dependency structures by dividing the snippet into one or more word groups, each comprising one or more words. Dependency structure builder 344 can add a leaf node to the dependency structure corresponding to each word group. Dependency structure builder 344 can then determine relationships between various of the word groups. In various implementations, the relationships can be between two word groups or three word groups. Dependency structure builder 344 can add a node representing a combination of nodes at a lower level. The added node can be connected by edges to the lower level nodes, where the added node represents a combination of the lower level nodes. Nodes can be added until a root node is added that represents a combination of all the word groups for the initial snippet. Each individual node in the dependency structure can be associated with (A) a snippet comprising the word groups associated with the lower level nodes connected to the individual node and (B) the relationship identified between the word groups corresponding to the lower level nodes connected to the individual node. An example of building a dependency structure is discussed below in relation to FIG. 5.

Semantic and syntactic model builder 346 can be configured to generate a semantic model and a syntactic model. In some implementations, semantic and syntactic model builder 346 can build models by receiving a dependency structure for a snippet, such as from dependency structure builder 344; obtaining a semantic and syntactic model each with default or random parameters; applying models, such as by semantic and syntactic model applier 348; scoring a composition resulting from the model applications, such as by composition scorer 350; and updating parameters of the models based on the score. Additional details regarding similar implementations of building semantic and syntactic models are discussed below in relation to FIG. 4A.

In some implementations, semantic and syntactic model builder 346 can build models by receiving two dependency structures; applying two language specific compositors to the corresponding dependency structure with a corresponding language to obtain semantic representations; applying two language specific removers to the corresponding semantic representation with a corresponding language to obtain representations mapped into the same language independent space; computing a difference in the language independent space between the two representations, and using the difference to adjust parameters of any of the language specific compositors or language specific removers. The dependency structures can be received through interface 342 and can be for snippets that are direct translations of each other in different languages. Each language specific compositor and language specific remover can correspond to a source language for one of the two snippets. Each language specific compositor and language specific remover can be models initially with default or random parameters, where adjusting the parameters based on the differences in language independent space can improve the ability of these models to create semantic representations and map semantic representations into language independent space.

Semantic and syntactic model applier 348 can be configured to iterate through the nodes of a dependency structure and generate a semantic representation corresponding to each node and a syntactic representation for each node or for each non-root node. In various implementations, iterating through a dependency structure can comprise starting with leaf nodes and preforming a depth-first traversal, breadth-first traversal, or another traversal such that, for each selected non-leaf node, the parent nodes of that selected node are evaluated first.

Semantic and syntactic model applier 348 can generate semantic representations of leaf nodes by receiving pre-defined representations of words or word groups to which the leaf node corresponds. For example, if the leaf node represents the word group "White House," a predefined semantic vector may exist for that word group, particularly when capitalized, indicating the home and office of the U.S. president.

In some implementations, syntactic representations corresponding to dependency structure nodes can indicate the use of the word or word group corresponding to that node, such as grammatically or as defined parts-of-speech. In some implementations, semantic and syntactic model applier 348 can generate syntactic representations of leaf nodes by receiving pre-defined representations of uses that indicate past observed uses of the word or word group to which the leaf node corresponds. For example, historical use of the word "card" can show that it is used as a noun 80% of the time, as in "here is my ID card," and as part of a verb phrase 20% of the time, as in "you look young, they are going to card you." In some implementations, semantic and syntactic model applier 348 can generate syntactic representations of leaf nodes by computing how corresponding words or word groups are used within the snippet the dependency structure represents. For example, in the snippet "his aim was true," the word "aim" is a noun, and a corresponding syntactic representation can be used. In some implementations, confidence factors can be used to generate a syntactic representation, such as when it is unclear whether "white" in "white house" is an adjective or part of a noun. In some implementations, a combination of the pre-defined and computed syntactic representations can be used.

In some implementations, semantic and syntactic model applier 348 can obtain semantic representations for a selected non-leaf node by applying a semantic model to the semantic and syntactic representations corresponding to the parent nodes of the selected non-leaf node. In some implementations, applying a semantic model to the semantic and syntactic representations corresponding to the parent nodes of the selected non-leaf node can comprise applying a semantic model that includes four transformation functions: a function T_Sem( ) that produces a tensor; a pair of functions M_Sem_Right( ) and M_Sem_Left( ) that each produce a square matrix; and a function V_Sem( ) that produces an offset vector. The semantic model can be applied to generate a semantic vector for a selected node C that has parent nodes A and B, where parent node A has semantic vector sem_a and syntactic vector syn_a and where parent node B has semantic vector sem_b and syntactic vector syn_b. This applying can generate a semantic vector sem_c for the selected node as: sem_c=T_Sem(syn_a, syn_b)*sem_a*sem_b+M_Sem_Left(syn_a, syn_b)*sem_a+M_Sem_Right(syn_a, syn_b)*sem_b+V_Sem(syn_a, syn_b).

In some implementations, semantic and syntactic model applier 348 can obtain syntactic representations for a selected non-leaf node by applying a syntactic model to the syntactic representations corresponding to the parent nodes of the selected non-leaf node and the semantic representation of the selected node, such as generated by semantic and syntactic model applier 348 as discussed above. In some implementations, applying a syntactic model to the semantic and syntactic representations corresponding to the parent nodes of the selected non-leaf node can comprise applying a syntactic model that includes five transformation functions: a function T_Sym( ) that produces a tensor; a pair of functions M_Sym_Right( ) and M_Sym_Left( ) that each produce a square matrix; function V_Sym( ) that produces an offset vector; and a rectangular matrix W_Syn that is a linear mapping from semantic space to syntactic space. The syntactic model can be applied to generate a syntactic vector for a selected node C, where node C has semantic vector sem_c and parent nodes A and B, where parent node A has syntactic vector syn_a and where parent node B has syntactic vector syn_b. This applying can generate a syntactic vector syn_c for the selected node as: syn_c=T_Sym(syn_a, syn_b)+M_Sym_Left(syn_a, syn_b)*sym_a+M_Sym_Right(syn_a, syn_b)*sym_b+V_Sym(syn_a, syn_b)+W_Syn*sem_c. In some implementations, creating a syntactic representation can be skipped when the semantic and syntactic model applier 348 reaches the root node of a dependency structure.

Composition scorer 350 can be configured to determine a score for a composition. A composition can include a dependency structure with semantic and syntactic representations corresponding to various of the nodes of the dependency structure. A composition can be scored using a scoring model, such as a trained neural network or other transformation function. In some implementations, the scoring model can receive a semantic and syntactic representation for a selected node of a dependency structure and generate a score for that selected node. In some implementations, a scoring model can be applied to a dependency structure by summing the score for each node. In some implementations, a scoring model can be applied to a dependency structure by summing the score for each node once each score is weighted according to its depth in the dependency structure, such as by multiplying the score by ($\frac{1}{2}$)^node_depth. For example, the score for the root node can be weighted at its full value: ($\frac{1}{2}$)^0, the weight for nodes at a level one below the root node can be weighted 0.5: ($\frac{1}{2}$)^1, the weight for nodes at a next lower level can be weighted at 0.25: ($\frac{1}{2}$)^2, etc. In some implementations, a scoring model can be applied to a dependency structure by taking the score for the root node of the dependency structure.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

FIG. 4A is a flow diagram illustrating a process 400 used in some implementations for training semantic and syntactic models. Process 400 begins at block 402 and continues to block 404. At block 404, process 400 can receive a snippet. The received snippet can have an identified source language.

At block 406, process 400 can build a dependency structure for the received snippet. In some implementations, a dependency structure can be a binary tree structure. In some implementations, a dependency structure can be an inverted tree structure, with: one or more leaf nodes each corresponding to one of the one or more words of the received snippet; one or more intermediate nodes based on a combination of the word groups associated with one or more of the one or more leaf nodes or one or more other intermediate nodes; and a root node based on a combination of the word groups associated with one or more of the one or more leaf nodes or one or more of the intermediate nodes. Each individual non-leaf node can have "parent nodes," which are the nodes associated with word groups that were combined to create the word group associated with that individual non-leaf node. Building a dependency structure can comprise: dividing the received snippet into word groups; creating a leaf node corresponding to each word group; and iteratively determining relationships between word groups of two or more nodes, referred to as combine nodes, that have not been combined with any higher level node, and creating a new node at a level one level higher than the highest level combine node. These iterations can be repeated until a root node is added, which is a node representing a word group comprising all the words of the received snippet. An example of building a dependency structure is illustrated below in FIG. 5.

At block 408, process 400 can compute semantic and syntactic representations of some or all of the nodes of the dependency structure built at block 406. Computing semantic representations of a selected leaf node can comprise obtaining pre-defined semantic representations of words in the selected leaf node. In some implementations, this can comprise combining pre-determined representations to generate a representation for the word group of the leaf node. For example, if the word corresponding to a leaf node is "queen" but no pre-determined semantic representation of this word exists, a lookup of the word can determine that "queen" refers to a female ruler. The pre-defined representations for the words "female" and "ruler" can be combined to generate a representation of the word "queen." Syntactic representations of leaf nodes can be determined by obtaining representations of a known historical usage of the word group or by obtaining representations of a usage of the word group in the snippet received at block 404.

A semantic representation of a selected non-leaf node can be generated by combining the semantic and syntactic representations of the parent nodes of that selected node. A syntactic representation of a selected non-leaf node can be generated by combining the syntactic representations of the parent nodes of that selected node and the semantic representation of that selected node. In some implementations, these representations can be generated using transformation function models, such as neural networks. Additional details regarding computing semantic and syntactic representations are discussed below in relation to FIG. 6.

At block 410, process 400 can generate a score for the composition generated at blocks 406 and 408. A composition can comprise a semantic representation of a snippet. A composition can comprise a syntactic representation of a snippet. A composition can also comprise a dependency structure. A composition can also comprise semantic representations of one or more nodes of the dependency structure. A composition can also comprise syntactic representations of one or more nodes of the dependency structure. A trained scoring function, such as a neural network or other transformation function, can receive a semantic and syntactic representation and generate a corresponding score. The score can indicate how reliably the semantic vector maps into a language independent space, i.e. how language independent the semantic vector is. In some implementations, generating a composition score can comprise using the scoring neural network to generate a score using the semantic representation of a snippet and the syntactic representation of that snippet, where these representations can be parts of the composition individually or can be representations corresponding to the root node of a dependency structure. In some implementations, generating a composition score can comprise summing scores for each node of a dependency structure which are each created using the semantic and syntactic representation corresponding to a node. In some implementations, generating a composition score can comprise summing weighted scores for each node of a dependency structure, which are each created using the semantic and syntactic representation corresponding to a node. The weights for each node can be $(½)^{depth}$, where depth is the maximum number of edges between that node and the root node of the dependency structure.

At block 412, process 400 can adjust parameters for the semantic model or syntactic model used in block 408 to generate semantic or syntactic representations of dependency structure nodes. This adjustment can be based on the score generated at block 410. For example, where the semantic or syntactic models are neural networks, parameters can be adjusted by modifying edge weights between nodes of the neural network. In some implementations, process 400 can be repeated one or more times with adjusted model weights until a better score is achieved at block 410.

At block 414, process 400 can return the adjusted semantic and syntactic models. Process 400 then continues to block 416, where it ends. In some implementations, process 400 can be repeated one or more times with different input snippets, or repeated with the same input snippets, to further train the semantic and syntactic models.

FIG. 4B is a flow diagram illustrating a process 450 used in some implementations for training compositors and language specifics removers. Process 450 begins at block 452 and continues to block 454. At block 454, process 450 can receive a pair of snippets. The received snippets can be snippets in different languages with the same semantic meaning. In various implementations, the snippets can be translations of each other, which can be performed by a human or by a machine translation engine or they can be snippets originally created in different source languages, such as two posts to a social media website that are selected as having the same meaning. At block 456, process 450 can build a dependency structure for each of the snippets received at block 454. Building a dependency structure is discussed above in relation to block 406 and FIG. 5.

Figure 6:
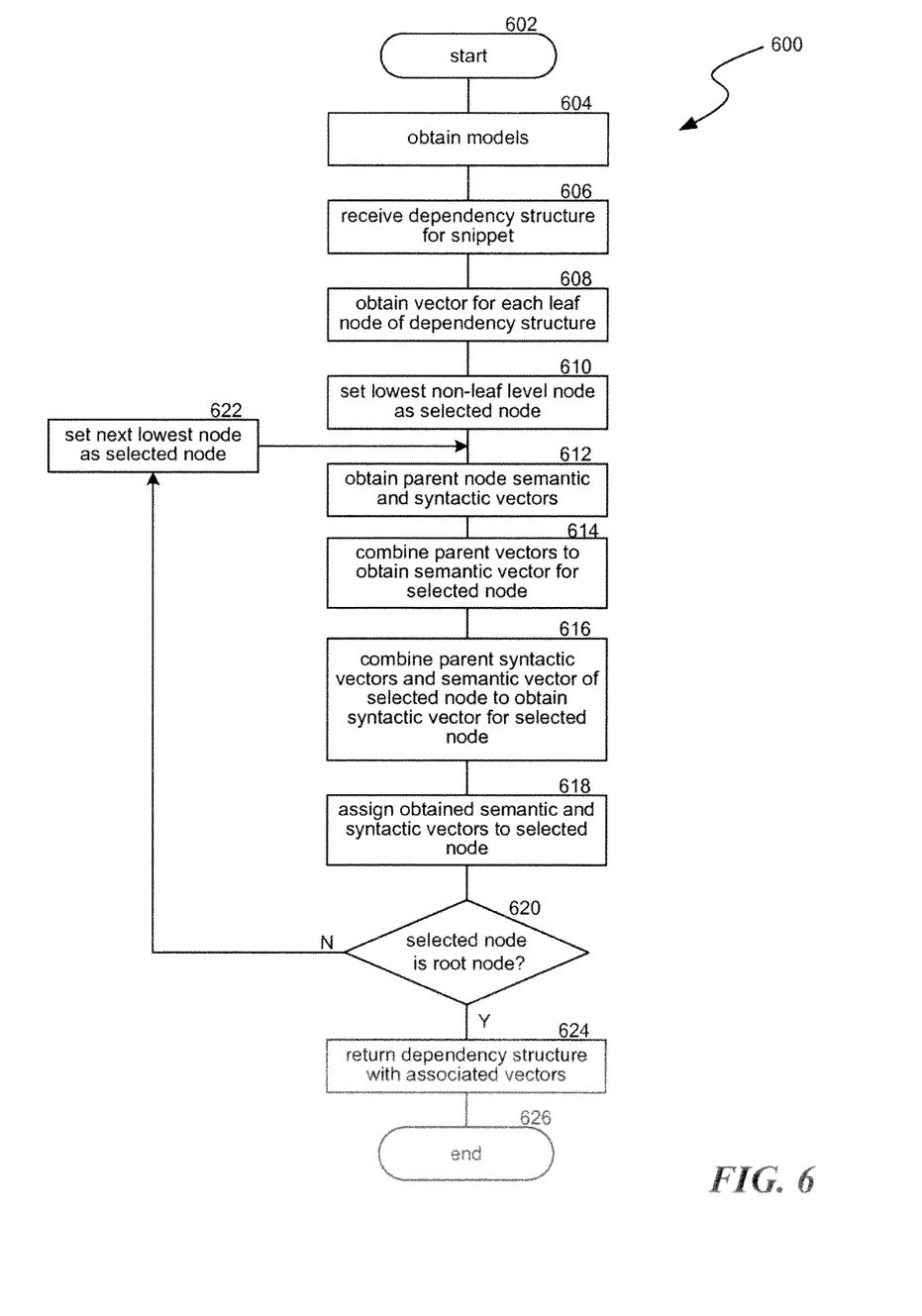
FIG. 6 is a flow diagram illustrating a process used in some implementations for applying semantic and syntactic models to a dependency structure of a snippet to generate a semantic representation of the snippet.

At block 458, process 450 can compute an semantic representation corresponding to each snippet using the dependency structure for each snippet. In some implementations, a compositor can include a semantic model or a syntactic model and can use process 600, discussed below, to generate a semantic representation of a snippet. This semantic representation can be the semantic representation corresponding to a root node of a dependency structure.

At block 460, process 450 can apply, to each selected semantic representation generated at block 458, a language specifics remover that is built for the language corresponding to the source language of the snippet that the selected semantic representation was generated from. The language specifics remover can be a trained function, such as a neural network, that maps a semantic representation into a language independent space. If the compositor and language specifics remover are perfect, after this mapping, two snippets in different languages should be mapped to the same locations in the language independent space.

At block 462, process 450 can compute a difference, in the language independent space, between the representation mapped into a language independent space at block 460. In some implementations, representations can be vectors, and the difference can be the cosine difference between the vector representations.

At block 464, process 450 can adjust, based on the difference computed at block 462, parameters of the compositors or language specifics removers. In some implementations, portions of the compositors or language specifics removers can be neural networks, and adjusting these neural networks can comprise modifying the weights of edges between one or more nodes of one or more of the neural networks.

At block 466, process 450 can return the adjusted language specific compositors and language specifics removers. Process 450 then continues to block 468, where it ends. In some implementations, process 450 can be repeated one or more times with different input snippets, or repeated with the same input snippets, to further train the language specific compositors and language specifics removers.

Figure 5:
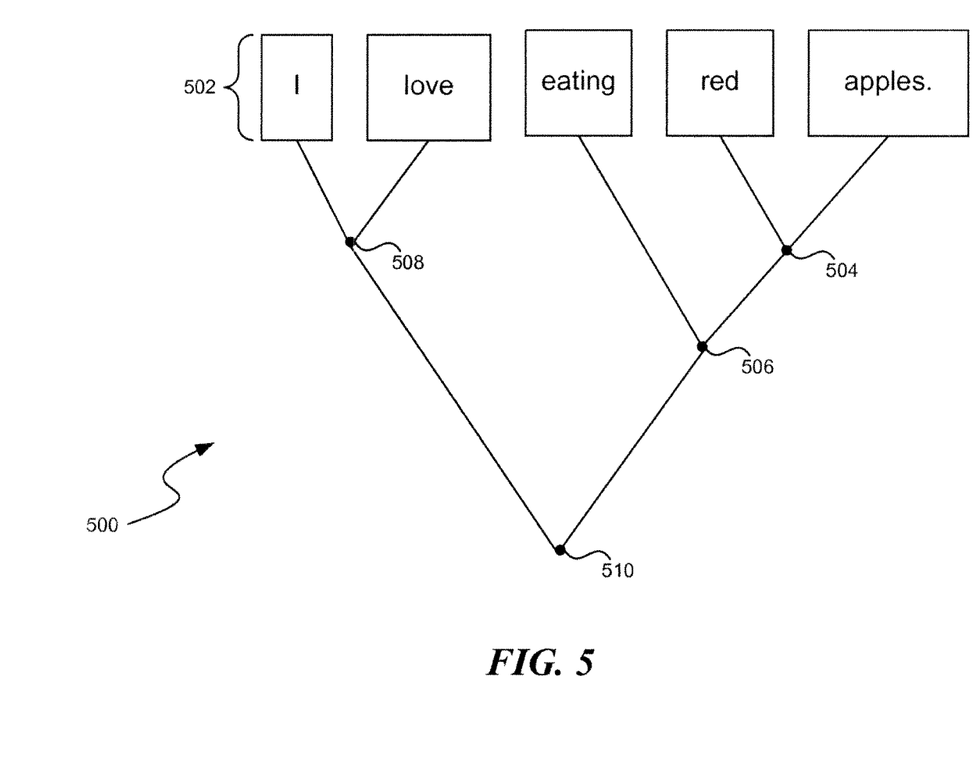
FIG. 5 is an example illustrating building a dependency structure for a selected language snippet.

FIG. 5 is an example 500 illustrating building a dependency structure for a selected language snippet: "I love eating red apples." Example 500 begins by dividing the language snippet into word groups, and a leaf node is added to the dependency structure for each word group at level 1, collectively leaf nodes 502. A relationship of "modifier" is then determined between the word groups "red" and "apples." The highest level of the nodes for "red" and "apples" is level 1, so an intermediate node 504 corresponding to the combination of "red apples" is added at the next highest level, level 2, with edges connected to the parent leaf nodes "red" and "apples."

Next, a relationship of "subject" is determined between the word groups "eating" and "red apples." The highest level of the nodes for "eating" and "red apples" is level 2, so an intermediate node 506 corresponding to the combination of "eating red apples" is added at the next highest level, level 3, with edges connected to the parent nodes "eating" and node 504.

Next, a relationship of "subject" is determined between the word groups "I" and "love." The highest level of the nodes for "I" and "love" is level 1, so an intermediate node 508 corresponding to the combination of "I love" is added at the next highest level, level 2, with edges connected to the parent leaf nodes "I" and "love."

Next, a relationship of "object" is determined between the word groups "I love" and "eating red apples." The highest level of the nodes for "I love" and "eating red apples" is level 3, so a node 510 corresponding to the combination of "I love eating red apples" is added at the next highest level, level 4, with edges connected to the parent nodes node 506 and node 508. Node 510 represents the entire snippet, so node 510 is the root node of the now complete dependency structure.

FIG. 6 is a flow diagram illustrating a process 600 used in some implementations for applying semantic and syntactic models to a dependency structure of a snippet to generate a semantic representation of the snippet. Process 600 begins at block 602 and continues to block 604. In some implementations, at block 604, process 600 can obtain one or more semantic models and one or more syntactic models. In some implementations, these models can include neural networks or other transformation functions. In various implementations, these models can be obtained from process 400, described above, or process 700, described below. In some implementations, at block 604, process 600 can obtain one or more language specific compositors and corresponding to the source language of a snippet under evaluation. In some implementations, these models can be obtained from process 450, described above. At block 606, process 600 can receive a dependency structure for a snippet, such as the dependency structure built at blocks 406 or 456, described above, or at block 706, described below.

At block 608, process 600 can obtain a semantic vector and a syntactic vector for each leaf node of the received dependency structure. In some implementations, semantic vectors for leaf nodes can be obtained by retrieving vectors that have been defined for the words or word groups corresponding to each leaf node. In some implementations, syntactic vectors corresponding to each leaf node can be obtained by retrieving vectors that have been defined for the corresponding use of the words or word groups historically or according to a type of use of the words or word groups in its snippet. For example, types of use can include grammatical classifications such as verb, noun, adverb, etc. or can be classifications defined for snippet combinations such as modifier, noun phrase, determiner, etc. In some implementations, process 600 can obtain syntactic representations by determining a modification or combination of vectors defined for words or word groups related to a word or word group corresponding to a node. For example, if a selected leaf node corresponds to the word "queen" and there are predefined vectors for the words "ruler" and "female," the combination of the vectors representing these words can be used as the semantic vector representing the word "queen."

At block 610, process 600 can set a first node at the lowest level of the dependency structure above the leaf level as a selected node. If there are multiple nodes at the same level, they can be selected in any order as long as they have not previously been operated on by the loop between blocks 612-622.

At block 612, process 600 can obtain the semantic and syntactic vectors that correspond to the parent nodes of the selected node. These can either be vectors obtained for leaf nodes at block 608 or vectors computed through previous iterations of the loop between blocks 612-622.

At block 614, process 600 can compute a semantic vector for the selected node. This can be accomplished by combining the syntactic and semantic vectors obtained at block 612 using semantic and semantic models. As discussed above, in some implementations, a semantic model can include four transformation functions: a function T_Sem( ) that produces a tensor; a pair of functions M_Sem_Right( ) and M_Sem_Left( ) that each produce a square matrix; and a function V_Sem( ) that produces an offset vector. The semantic vector for a selected node C can have parent nodes A and B, where parent node A has semantic vector sem_a and syntactic vector syn_a and where parent node B has semantic vector sem_b and syntactic vector syn_b. A semantic vector sem_c for the selected node can be computed as: sem_c=T_Sem(syn_a, syn_b)*sem_a*sem_b+M_Sem_Left(syn_a, syn_b)*sem_a+M_Sem_Right(syn_a, syn_b)*sem_b+V_Sem(syn_a, syn_b).

At block 616, process 600 can combine the syntactic vectors of the parent nodes obtained at block 612 with the semantic vector of selected node obtained at block 614 to obtain a syntactic vector for the selected node. In some implementations, block 616 can be skipped if the selected node is the root node of the dependency structure. As discussed above, in some implementations, the syntactic model can include five transformation functions: a function T_Sym( ) that produces a tensor; a pair of functions M_Sym_Right( ) and M_Sym_Left( ) that each produce a square matrix; and a function V_Sym( ) that produces an offset vector; and a rectangular matrix W_Syn that is a linear mapping from semantic space to syntactic space. A syntactic vector syn_c for the selected node can be computed as: syn_c=T_Sym(syn_a, syn_b)+M_Sym_Left(syn_a, syn_b)*sym_a+M_Sym_Right(syn_a, syn_b)*sym_b+V_Sym(syn_a, syn_b)+W_Syn*sem_c.

At block 618, process 600 can assign the vectors computed at blocks 614 and 616 to the selected node.

At block 620, process 600 can determine whether the selected node is the root node of the dependency structure, which would mean that semantic and syntactic vectors have been computed for all the nodes of the dependency structure. If so, process 600 can continue to block 624. If not, process 600 can continue to block 622.

At block 622, process 600 can set a next node of the dependency structure as the selected node to be operated on by the loop between blocks 612-622. Process 600 can select this next node as another node at the same level as the previous selected node that has not been operated on by the loop between blocks 612-622. If there are no more nodes at the same level as the previous selected node that have also not been operated on by the loop between blocks 612-622, process 600 can select this next node as any node in the level that is one level above the level of the previous selected node. Once the loop between blocks 612-622 has operated on all the blocks in the dependency structure, process 600 can continue to block 626.

At block 624, process 600 can return an indication of the dependency structure with a semantic and syntactic vector associated with each node. Process 600 can then continue to block 626, where it ends.

Figure 7:
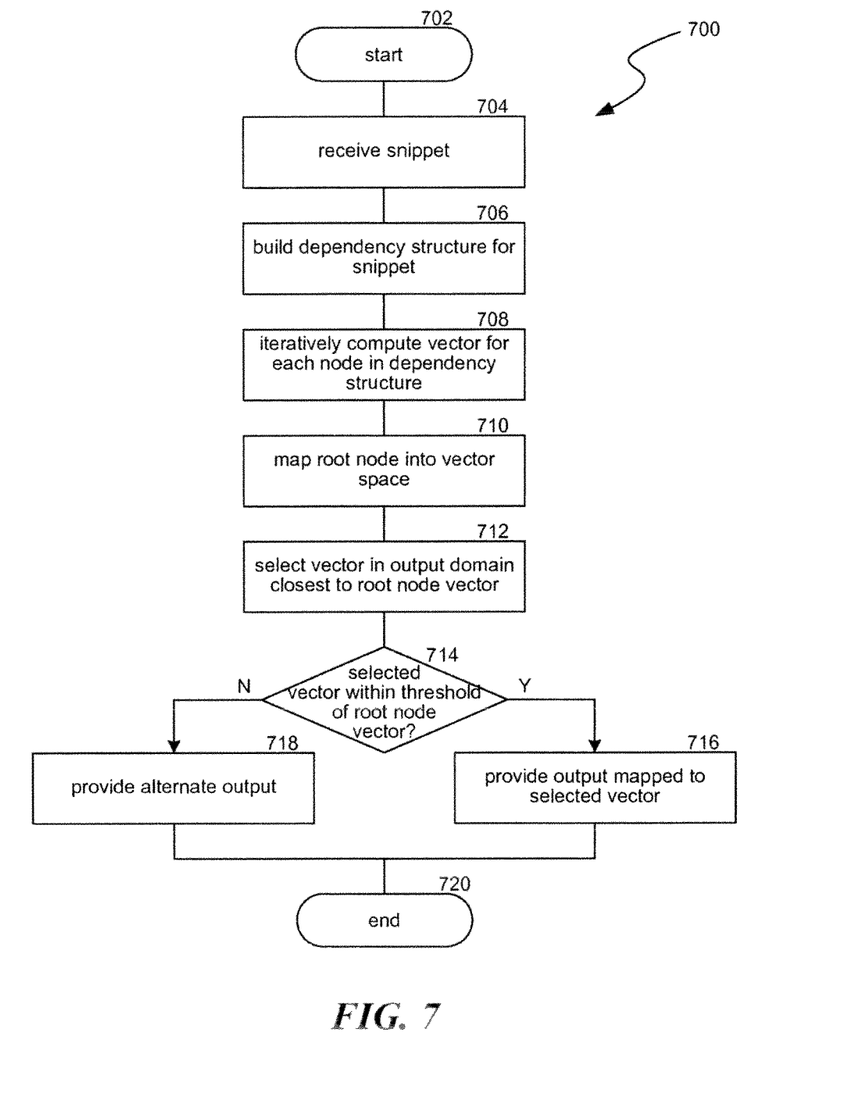
FIG. 7 is a flow diagram illustrating a process used in some implementations for obtaining a domain transformation of a selected snippet.

FIG. 7 is a flow diagram illustrating a process 700 used in some implementations for obtaining a domain transformation of a selected snippet. Process 700 begins at block 702 and continues to block 704. At block 704, process 700 can receive a snippet that is to be transformed into a snippet in a different domain, referred to as the "output domain." For example, the output domain can be an alternate language, a corrected version of the language of the received snippet, a response to the received snippet, etc.

At block 706, process 700 can build a dependency structure for the received snippet. Process 700 can build a dependency structure in the same manner discussed above in relation to block 406 of FIG. 4 and the example in FIG. 5.

At block 708, process 700 can apply semantic and syntactic models to obtain a semantic vector for each node in the dependency structure built at block 706 and to obtain a syntactic vector for at least each non-root node in the dependency structure built at block 706. Process 700 can accomplish this for each selected leaf node by obtaining pre-defined word or word group semantic vectors and corresponding syntactic vectors corresponding to the type of use of the word or word group in the snippet, corresponding to the type of use of the word or word group historically, or both. Process 700 can then compute semantic and syntactic vectors for each non-leaf node of the dependency structure. In some implementations, only a semantic vector is computed for the root node of the dependency structure. Process 700 can compute a semantic vector for a selected node by applying a semantic model, such as a semantic model produced by process 400 or 450, to the semantic and syntactic vectors corresponding to the parent node of the selected node. Process 700 can compute a syntactic vector for a selected node by applying a syntactic model, such as a syntactic model produced by process 400 or 450, to the syntactic vectors corresponding to the parent node of the selected node and the semantic vector corresponding to the selected node. Applying semantic and syntactic models to a dependency structure of a snippet to generate a semantic vector representation of the snippet is discussed in greater detail above in relation to FIG. 6.

At block 710, process 700 can map the semantic vector corresponding to the root node of the dependency structure, which is the semantic vector representing the entire snippet received at block 704, into a language independent space, such as a vector space. This vector space can be a coordinated system common across multiple domains such that vectors corresponding to snippets in multiple domains can be mapped into the same vector space. In some implementations, the vector space can be one that has already had multiple vectors corresponding to other snippets that are in the output domain mapped into the vector space using a process similar to that described above in relation to blocks 704-710.

At block 712, process 700 can select a vector in the vector space that corresponds to a snippet in the output domain. Process 700 can make this selection by selecting a vector that corresponds to a snippet in the output domain that is also closest to the vector mapped into the vector space at block 710. In some implementations, process 700 can use the cosine difference between vectors to make determinations about relative closeness between vectors.

In some implementations, process 700 can make a determination at block 714 of whether a difference between the vector selected at block 712 and the vector mapped into the vector space at block 710 are within a threshold difference of each other. This determination can indicate whether there is a snippet in the output domain that has a vector mapped into the vector space that is a reasonable transformation of the received snippet. If there is a vector that is sufficiently close, process 700 can continue to block 716. If there is not a vector that is sufficiently close, process 700 can continue to block 718. In some implementations, there is not a vector closeness requirement, in which case process 700 proceeds directly from block 712 to block 716. At block 716, process 700 can provide an indication of the snippet corresponding to the vector selected at block 712. This snippet, which is in the output domain, can be used as the transformed version of the snippet received at block 704. Process 700 then continues to block 720.

At block 718, there is not a snippet in the output domain with a vector mapped into the vector space that is sufficiently similar to the vector mapped into the vector space at block 710. In this case, process 700 can use the results of alternate language processing mechanisms to obtain a transformation of the received snippet. For example, where the output domain is an alternate language, process 700 can use the results of another machine translation engine. As another example, where the output domain is a correction, process 700 can use the results of a spelling or grammar correction engine. In some implementations, these results can be generated in parallel to the operations performed at blocks 704-714, thereby permitting these results to be more readily available if they are needed. In some implementations, process 700 can use aspects of the processing from blocks 704-712 as part of the alternate language processing mechanisms whose results are used at block 718. For example, ambiguities between multiple possible machine translation results can be resolved by using the possible machine translation result that is most similar to the snippet corresponding to the vector selected at block 712. Process 700 can return an indication of the results determined at block 718. Process 700 then continues to block 720, where it ends. Additional details about applying a vector space can be found the U.S. patent application Ser. No. 14/878,762, titled Deep Translations, filed on the same day as the instant application, which is hereby incorporated by reference.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc. As used herein, "obtaining" or "generating" something can mean receiving that thing from another source or creating it.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:
receiving a snippet, wherein the snippet comprises a digital representation of one or more words or groups of characters from a first natural language;
transforming the received snippet into a first semantic vector in a virtual language independent vector space;
determining whether a second semantic vector exists in the virtual language independent space that is within a threshold difference of the first semantic vector; and
providing, as a translation of the snippet, content in an output domain that corresponds to a second semantic vector when a second semantic vector within the threshold difference has been identified.

2. The method of claim 1 further comprising:
providing, as a translation of the snippet, a translation from one or more alternate language processing systems when it is determined that no second semantic vector exists in the virtual language independent vector space that is within the threshold difference of the first semantic vector.

3. The method of claim 2 further comprising:
locating a second semantic vector that is the closest in the virtual language independent vector space, to the first semantic vector; and
using the second semantic vector to resolve ambiguities between multiple possible machine translation results.

4. The method of claim 1, further comprising building a dependency structure by:
dividing the received snippet into groups of one or more words;
assigning each group of one or more words as a leaf node in the structure;
creating intermediate nodes in the dependency structure by identifying relationships between word groups and combining the related word groups into an intermediate node having the nodes containing the combined word groups as children; and
iteratively creating intermediate nodes until a single root node is obtained representing the snippet.

5. The method of claim 4 further comprising:
obtaining pre-defined semantic and syntactic representations for the word groups in the leaf nodes; and
obtaining semantic and syntactic representations for each intermediate node by applying a learned function to the semantic and syntactic representations of the lower-level nodes that were combined to create the intermediate node.

6. The method of claim 5 further comprising:
using the semantic representation of the root node as the first semantic vector; and
mapping the first semantic vector into the virtual language independent vector space.

7. The method of claim 5 wherein the virtual language independent vector space includes output vectors corresponding to snippets in the output domain.

8. The method of claim 1 wherein the output domain is a second natural language or a correction of the first natural language.

9. A system comprising:
a processor;
memory, in communication with the processor, the memory containing instructions that, when executed, cause the processor to:
receive a snippet, wherein the snippet comprises a digital representation of one or more words or groups of characters from a first natural language;
transform the received snippet into a first semantic vector in a virtual language independent vector space;
determine whether a second semantic vector exists in the virtual language independent space that is within a threshold difference of the first semantic vector; and
provide, as a translation of the snippet, content in an output domain that corresponds to a second semantic vector when a second semantic vector within the threshold difference has been identified.

10. The system of claim 9, the instructions further causing the processor to:
provide, as a translation of the snippet, a translation from one or more alternate language processing systems when it is determined that no second semantic vector exists in the virtual language independent vector space that is within the threshold difference of the first semantic vector.

11. The system of claim 10, the instructions further causing the processor to:
locate a second semantic vector that is the closest in the virtual language independent vector space, to the first semantic vector; and
use the second semantic vector to resolve ambiguities between multiple possible machine translation results.

12. The system of claim 9, further comprising building a dependency structure by:
dividing the received snippet into groups of one or more words;
assigning each group of one or more words as a leaf node in the structure;
creating intermediate nodes in the dependency structure by identifying relationships between word groups and combining the related word groups into an intermediate node having the nodes containing the combined word groups as children; and
iteratively creating intermediate nodes until a single root node is obtained representing the snippet.

13. The system of claim 12 further comprising:
obtaining pre-defined semantic and syntactic representations for the word groups in the leaf nodes;
obtaining semantic and syntactic representations for each intermediate node by applying a learned function to the semantic and syntactic representations of the lower-level nodes that were combined to create the intermediate node;
using the semantic representation of the root node as the first semantic vector; and
mapping the first semantic vector into the virtual language independent vector space.

14. The system of claim 9 wherein the virtual language independent vector space includes output vectors corresponding to snippets in the output domain.

15. The system of claim 14 wherein the output domain is a second natural language or a correction of the first natural language.

16. A non-transitory, computer-readable storage medium containing instructions that, when executed by a processor, cause the processor to:
receive the snippet, wherein the snippet comprises a digital representation of one or more words or groups of characters from a first natural language;
transform the received snippet into a first semantic vector in a virtual language independent vector space;
determine whether a second semantic vector exists in the virtual language independent space that is within a threshold difference of the first semantic vector; and
provide, as a translation of the snippet, content in an output domain that corresponds to a second semantic vector when a second semantic vector within the threshold difference has been identified.

17. The non-transitory, computer-readable storage medium of claim 16, the instructions further causing the processor to:
provide, as a translation of the snippet, a translation from one or more alternate language processing systems when it is determined that no second semantic vector exists in the virtual language independent vector space that is within the threshold difference of the first semantic vector.

18. The non-transitory, computer-readable storage medium of claim 17, the instructions further causing the processor to:
locate a second semantic vector that is the closest in the virtual language independent vector space, to the first semantic vector; and
use the second semantic vector to resolve ambiguities between multiple possible machine translation results.

19. The non-transitory, computer-readable storage medium of claim 16, wherein the virtual language independent vector space includes output vectors corresponding to snippets in the output domain.

20. The non-transitory, computer-readable storage medium of claim 19 wherein the output domain is a second natural language or a correction of the first natural language.

* * * * *